Aug. 24, 1965
P. G. IVANCHICH
3,202,005
MULTIPLE SPEED RATIO POWER TRANSMISSION MECHANISM
WITH FULLY SYNCHRONIZED SPEED RATIO SHIFTS
Filed Aug. 22, 1963
7 Sheets-Sheet 6
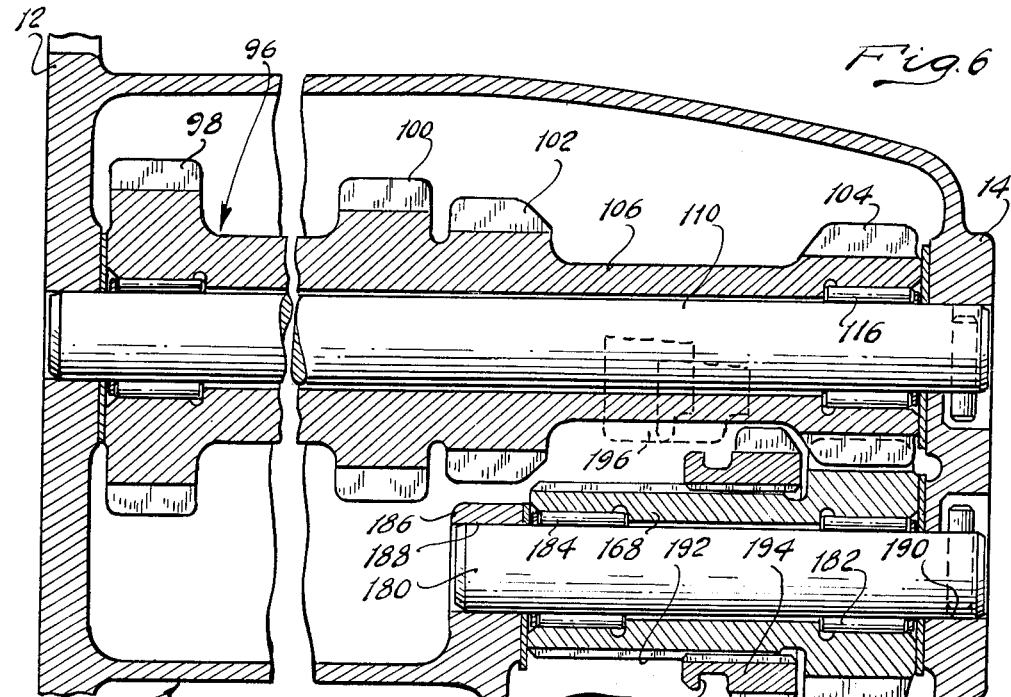
Fig. 6
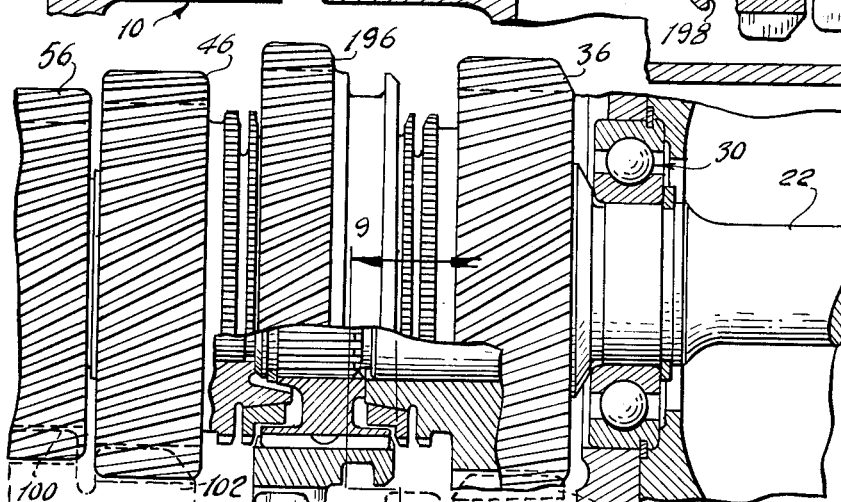
Fig. 7
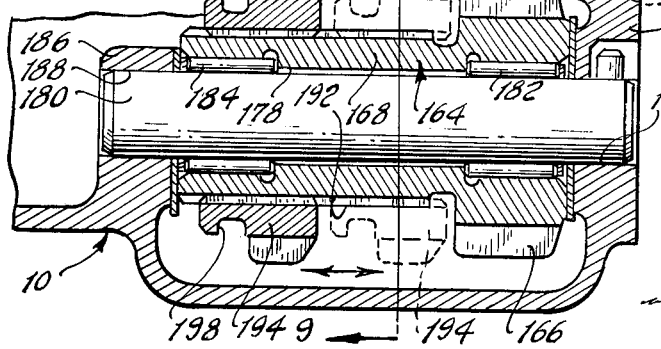
INVENTOR:
PETER G. IVANCHICH
BY
ATTORNEYS

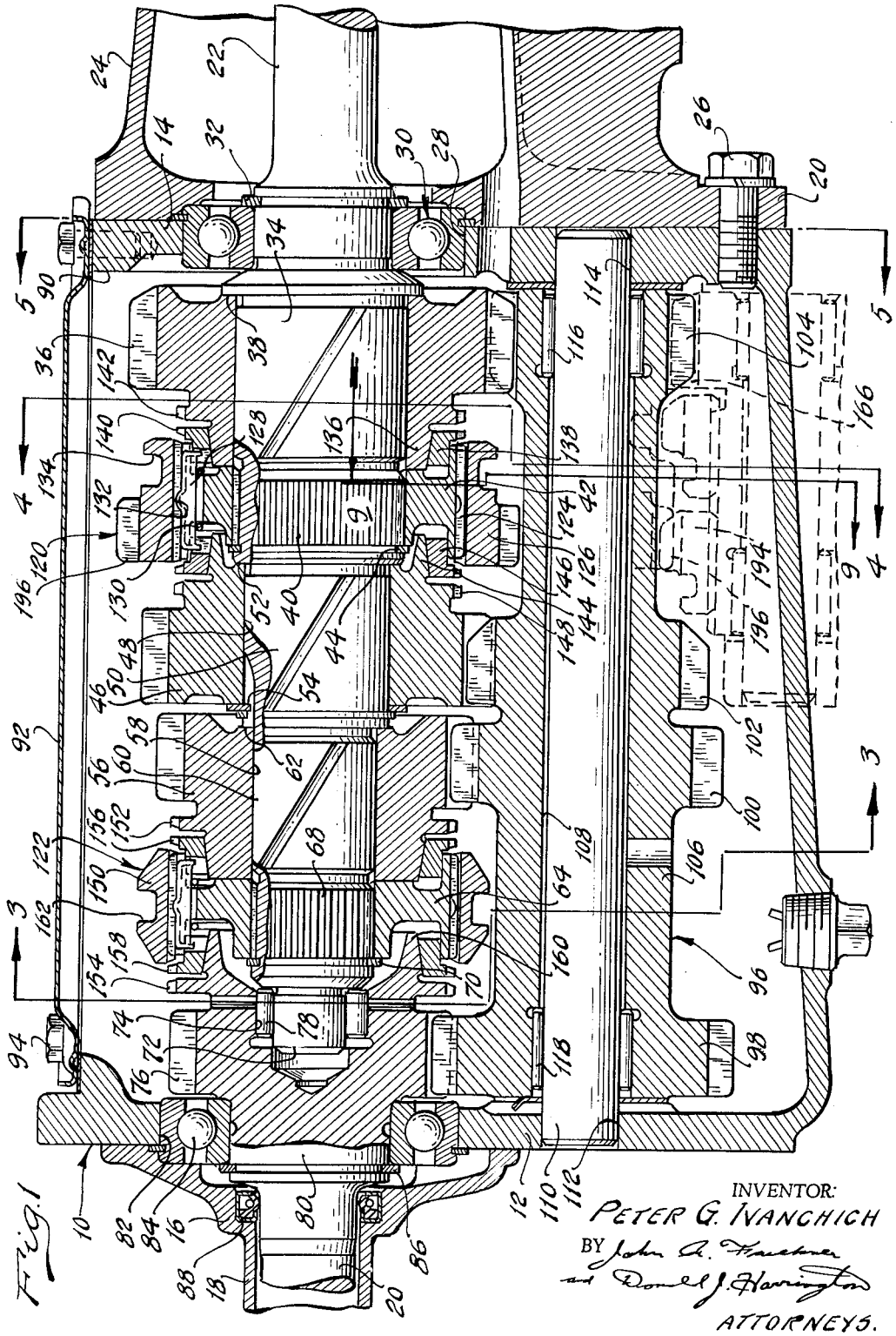

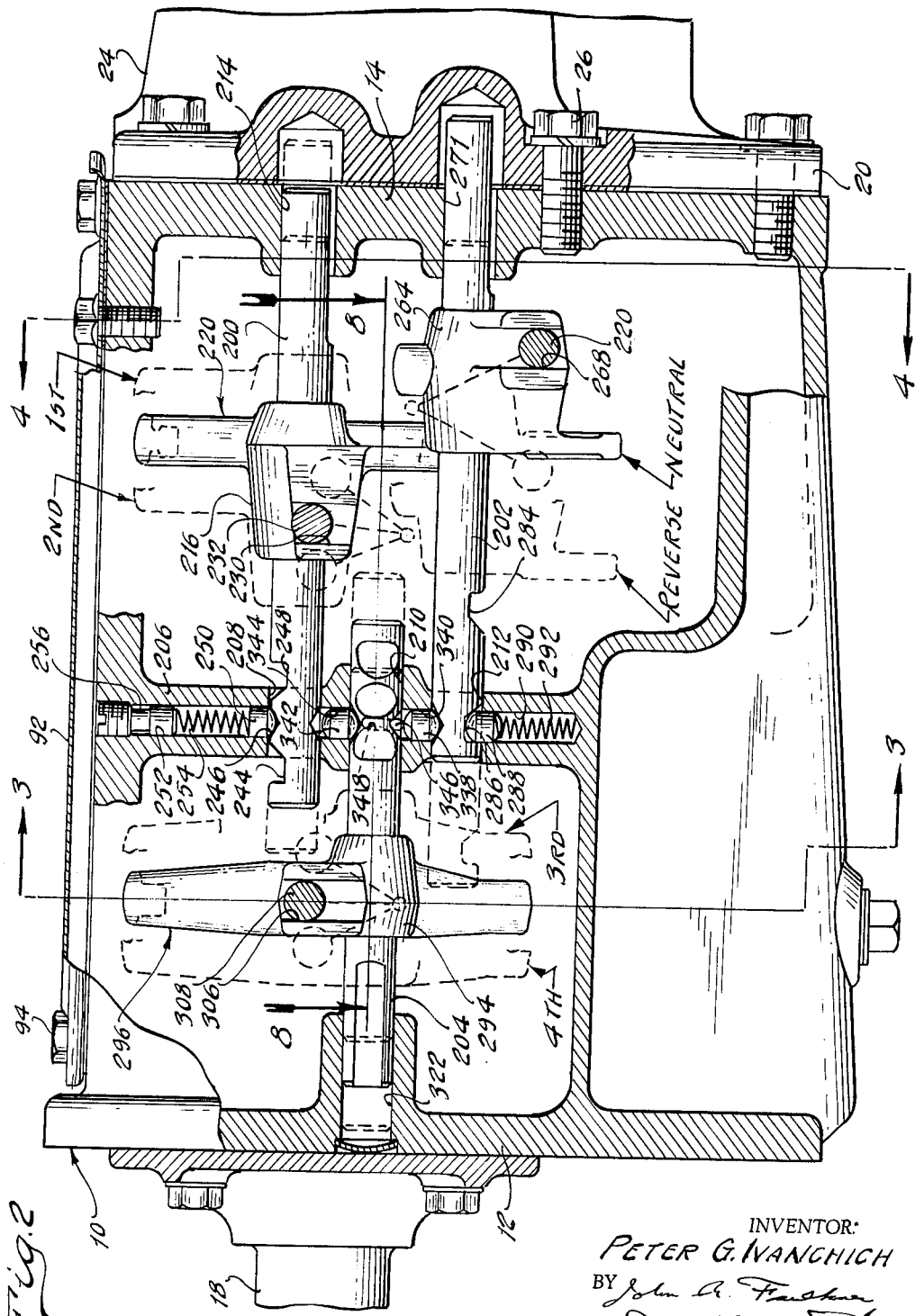

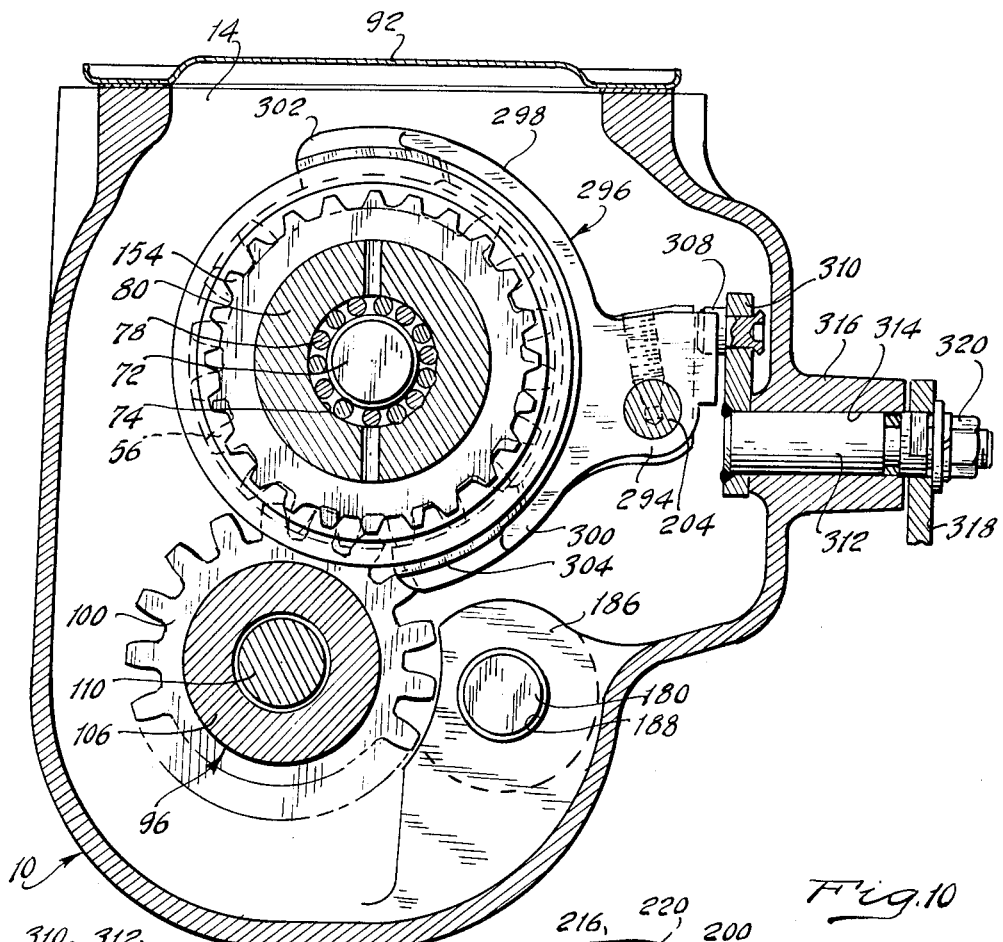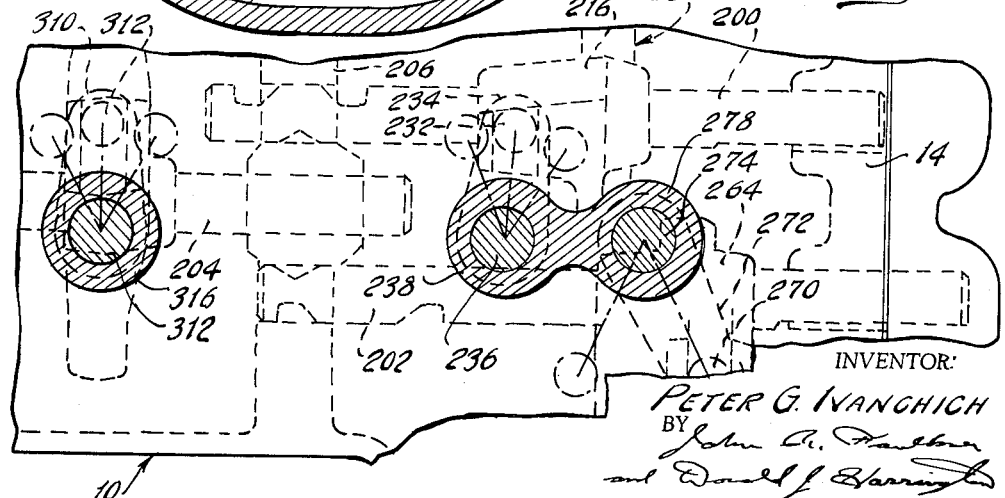

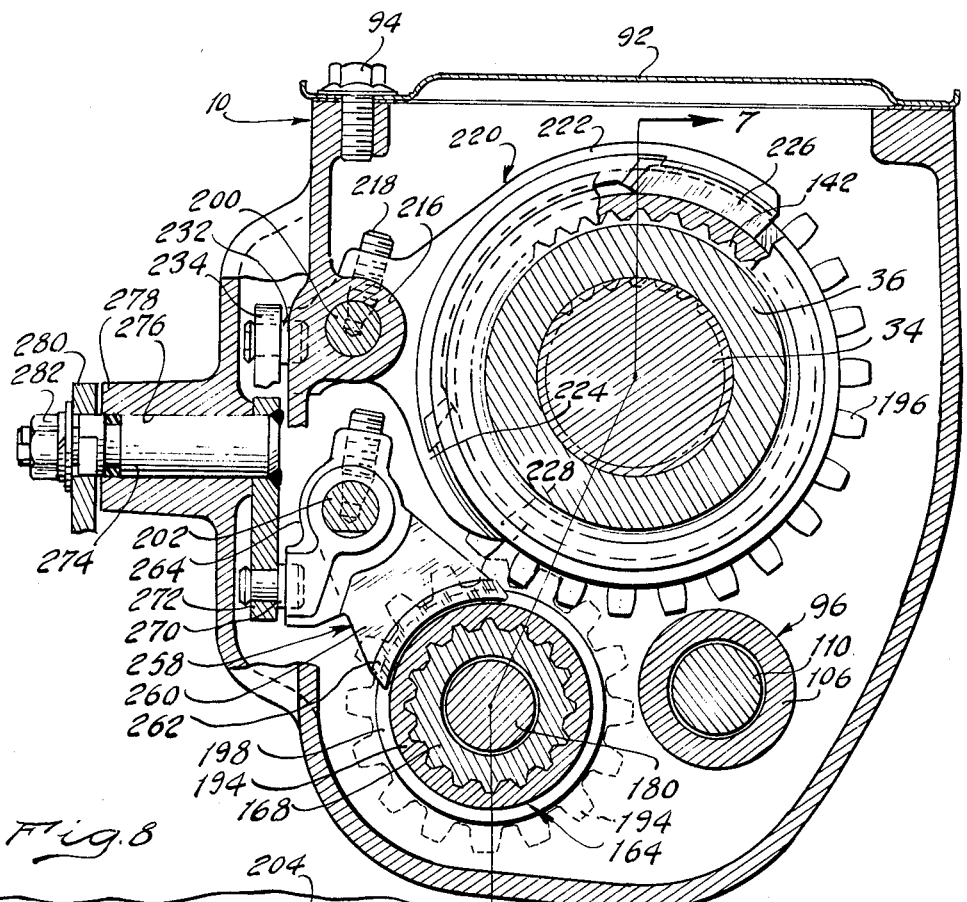
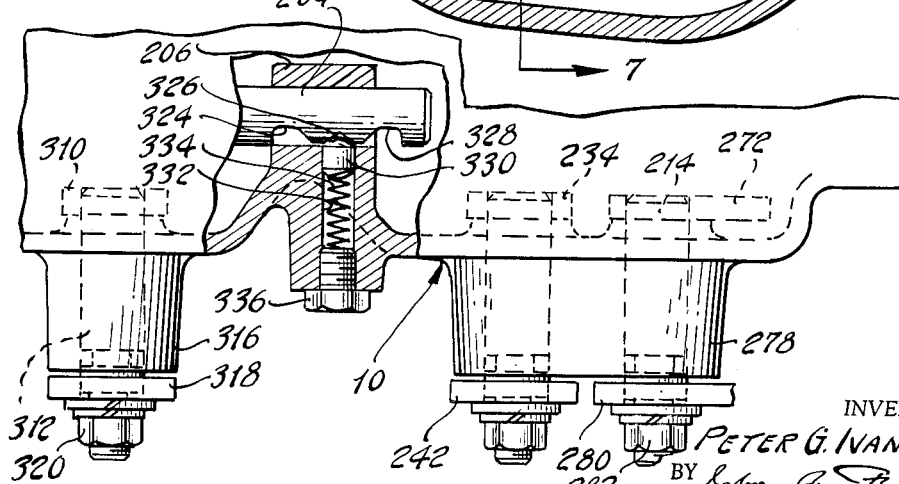

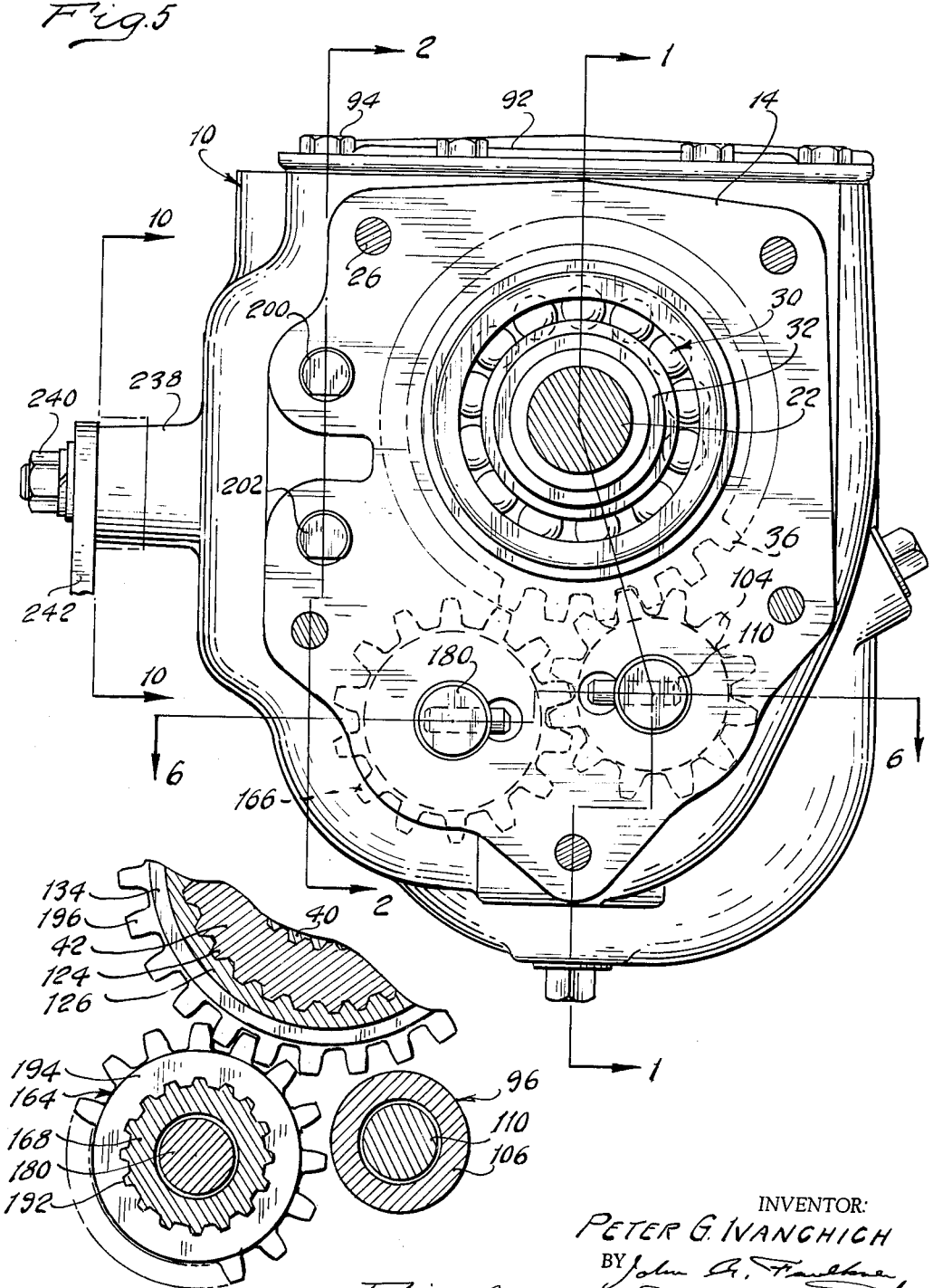

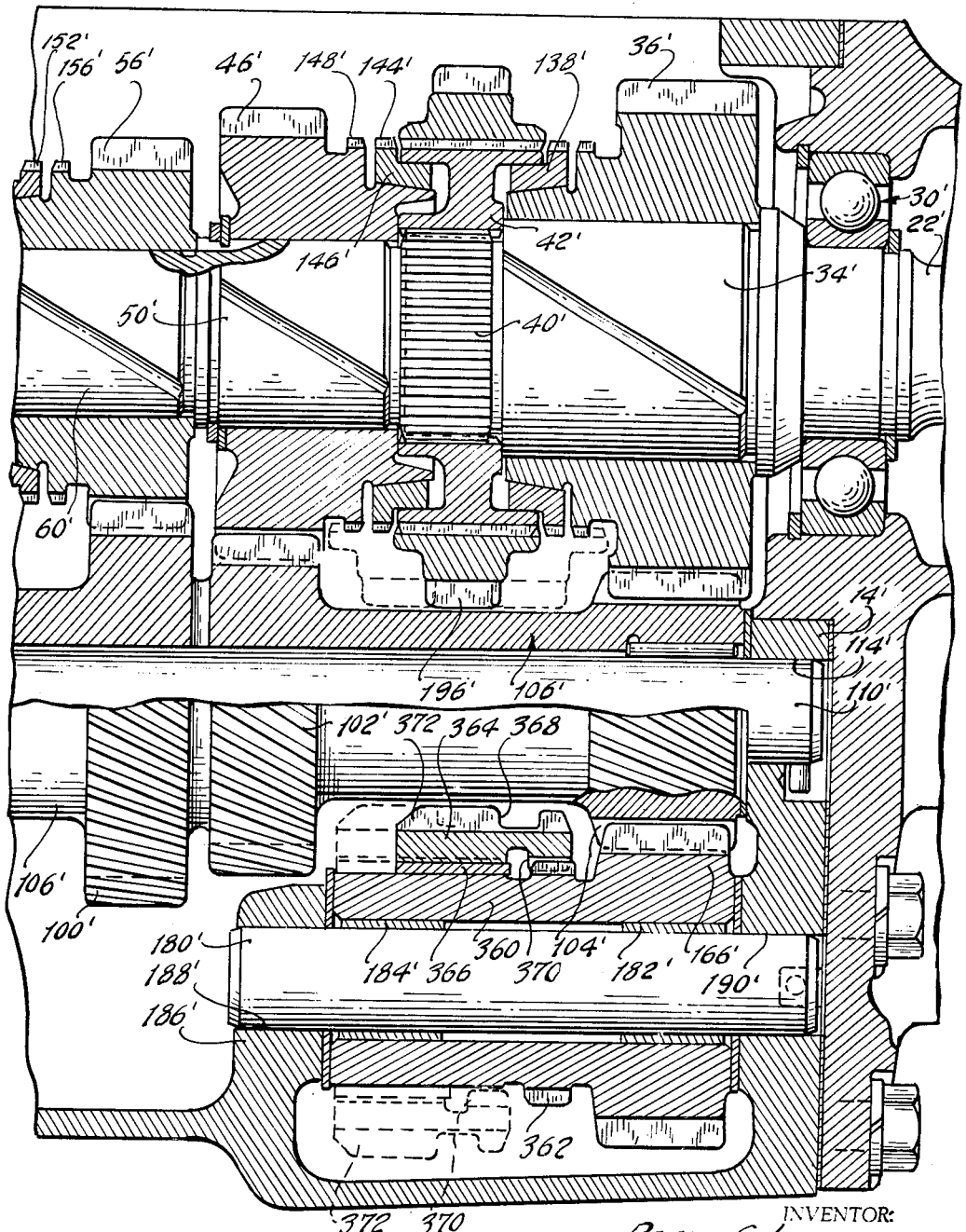

United States Patent Office 3,202,005
Patented Aug. 24, 1965

3,202,005
MULTIPLE SPEED RATIO POWER TRANSMISSION MECHANISM WITH FULLY SYNCHRONIZED SPEED RATIO SHIFTS
Peter George Ivanchich, Dearborn, Mich., assignor to Ford Motor Company, Dearborn, Mich., a corporation of Delaware
Filed Aug. 22, 1963, Ser. No. 303,788
6 Claims. (Cl. 74—333)

My invention relates generally to improvements in multiple speed ratio power transmission mechanisms, and more particularly to a fully synchronized multiple speed ratio power transmission mechanism for automotive vehicle drivelines wherein provision is made for manually selecting any one of four forward driving speed ratios and a single reverse drive ratio.

According to a principal feature of my invention, a shift from one forward driving speed ratio to another is accomplished by synchronously clutching together two associated elements of the torque delivery system.

It is common practice in designing automotive vehicle power transmission mechanisms of this type to provide a cluster gear assembly having gear elements that are adapted to mesh with main torque transmitting gears that in turn are mounted for rotation about the axis of the driven member. The cluster gear assembly is mounted for rotation about a countershaft that is situated in parallel spaced relationship with respect to the driven member. One gear element of the cluster gear assembly is in continuous meshing engagement with a power input gear of the assembly, the power input gear in turn being driven by a driving member. It is common practice also to include within the cluster gear assembly a reverse drive gear element that is adapted to mesh with the reverse drive pinion. Provision is made during reverse drive operation in such an arrangement for drivably connecting one of the principal troque transmitting gears of the mechanism with the reverse drive pinion to establish a reverse motion of the driven member.

The cluster gear assembly in a mechanism of this type, of necessity, must be sufficient axial length to accommodate all of the forward driving gear elements as well as the reverse drive gear element. This increases the over-all axial length of the transmission assembly. Although this is undesirable in itself, it leads to other design problems such as those arising out of the corresponding relatively wide spacing of the end support bearings for the countershaft.

Such an arrangement also makes it difficult to incorporate within the transmission mechanism a reverse ratio that is of sufficient magnitude to meet certain operating conditions. The reverse ratio, of course, is determined by the relative pitch diameters of the reverse gear element of the cluster gear assembly and the pitch diameter of the reverse gear of the main gear assembly with which the reverse drive gear element meshes. The pitch diameter of the reverse gear element of the cluster gear assembly can be reduced in magnitude to increase the reverse drive ratio, but stress considerations limit the degree to which it can be reduced. Furthermore, such a reduction in the pitch diameter of the reverse gear element would require a corresponding increase in the pitch diameter of the main reverse gear, but the necessary design flexibility in this area is lacking since interference between the teeth of the main reverse gear and the gear elements of the cluster gear assembly will occur.

I have overcome these disadvantages by providing a mechanism having fully synchronized forward driving speeds and wherein reverse drive can be obtained by means of a split reverse pinion having one portion thereof engageable constantly with one of the forward driving gear elements of the cluster gear assembly and another portion that is adapted to mesh with the main reverse gear of the assembly during reverse drive. I contemplate that the split reverse pinion can be mounted at any convenient location upon an axis that is parallel to the axis of the cluster gear assembly. The diameter of the split reverse pinion can be varied to meet a variety of design requirements without interference with other elements of the gear system. I contemplate also that the main reverse gear of the assembly will be axially spaced from each of the two adjacent reverse gear elements of the cluster gear assembly thereby eliminating the possibility of interference between it and the cluster gear assembly.

According to another feature of my invention, the main reverse gear element forms also a portion of the forward driving torque delivery path. The magnitude of the forward driving gear ratio and the reverse gear ratio can be varied to suit varying operating requirements, and a change in one ratio during the design of the mechanism will not influence necessarily the magnitude of the other ratio.

The provision of a power transmission mechanism of the type above set forth being a principal object of my invention, it is a further object of my invention to provide a multiple speed ratio power transmission mechanism for automotive vehicles which is characterized by four forward driving, evenly spaced speed ratios and a single reverse speed ratio, the torque delivery path associated with each ratio being defined in part by a synchronizer clutch mechanism whereby speed ratio shifts will be relatively smooth and effortless.

It is a further object of my invention to provide a multiple speed ratio power transmission mechanism of the type above set forth and which is characterized further by its minimum dimensions for any given torque transmitting capacity.

Further objects and features of my invention will become apparent from the following description and from the accompanying drawings, wherein:

FIGURE 1 shows a longitudinal cross sectional view of my improved power transmission mechanism;

FIGURE 2 is a cross sectional view showing a shift rail arrangement for my mechanism. It is taken along the vertical plane of section line 2—2 of FIGURE 5;

FIGURE 3 is a transverse cross sectional view taken along the plane of section line 3—3 of FIGURE 2;

FIGURE 4 is a transverse cross sectional view taken along the plane of section line 4—4 of FIGURE 2;

FIGURE 5 is a transverse cross sectional view taken along the plane of section line 5—5 of FIGURE 1;

FIGURE 6 is a cross sectional view showing the split reverse pinion and cluster gear assembly of my mechanism. It is taken along the plane of section line 6—6 of FIGURE 5;

FIGURE 7 is a longitudinal cross sectional view taken along the plane of section line 7—7 of FIGURE 4;

FIGURE 8 is a partial cross sectional view taken along the plane of section line 8—8 of FIGURE 2;

FIGURE 9 is a transverse cross sectional view taken along the plane of section line 9—9 of FIGURE 7;

FIGURE 10 is a partial cross sectional view taken along the plane of section line 10—10 of FIGURE 5, and FIGURE 11 is a cross sectional assembly view of a modified split reverse pinion for use in a gear arrangement of the type shown in FIGURE 1.

Referring first to FIGURE 1, numeral 10 designates generally a transmission housing. It includes a forward wall 12 and a rear wall 14. The wall 12 is adapted to be secured in the usual fashion to a clutch housing, not shown. The clutch housing in turn can be connected to the engine block of an internal combustion vehicle engine.

Secured to the forward wall 12 is a bearing adaptor 16. It includes a stationary sleeve shaft 18 upon which may be journaled a clutch throw-out bearing and rotary portions of a neutral clutch which may be adapted to connect drivably the vehicle engine crankshaft with a power input shaft 20 for the transmission mechanism. Shaft 20 is received within shaft 18.

The power output shaft is shown at 22. It is situated within a tailshaft extension housing 24 which is bolted at its periphery 26 to the end wall 14 for the housing 10, suitable bolts 26 being provided for this purpose. Wall 14 is formed with a bearing opening 28 through which shaft 22 extends. A bearing 30 is received within the opening 28 for the purpose of journaling shaft 22.

The inner race of bearing 30 is held axially fast with respect to shaft 22 by means of a snap ring 32. Shaft 22 is formed with a bearing portion 34 upon which is journaled a low speed gear 36. The hub of gear 36 engages a shoulder 38 formed on the shaft portion 34.

Shaft 22 is formed also with a splined portion 40 over which is received a synchronizer clutch hub 42. The hub 42 is internally splined to form a positive driving connection with the shaft 22. A snap ring 44 holds the hub 42 in engagement with the hub of gear 36.

A second speed gear is shown at 46. It is formed with an opening 48 through which is received a bearing portion 50 of the shaft 22. Gear 46 thereby is rotatably journaled upon shaft 22. Its hub engages a shoulder 52 formed on the hub portion 50. A snap ring 54 holds the gear 46 axially fast.

A third speed gear is shown at 56. It is formed with a central opening 58 through which bearing portion 60 of the shaft 22 is received. Gear 56 is journaled rotatably upon shaft 22. Its hub engages a shoulder 62 formed on the shaft portion 60, and the other end of the hub of gear 56 engages a synchronizer clutch hub 64. This hub 64 in turn is formed with a central opening that is internally splined at 66 to an externally splined portion 68 of the shaft 22. Hub 64 is held axially fast by means of a snap ring 70.

The end of shaft 22 is formed with a reduced diameter as indicated at 72. It is received within a pilot bearing opening 74 formed in a power input gear 76. The shaft end 72 is journaled within the opening 74 by bearing elements 78.

Power input gear 76 includes an extension 80 that is received through a bearing opening 82 formed in the forward wall 12 of the housing 10. A bearing 84 is situated within the opening 82 for the purpose of rotatably supporting the gear 76. The inner race of bearing 84 is held axially fast by means of a snap ring 86. The extension 80 forms a part of or is connected to the shaft 20.

A fluid seal 88 is disposed between the shaft 20 and the adaptor 16 to isolate the interior of housing 10 from the neutral clutch structure.

The upper portion of the housing 10 is formed with an access opening 90 to permit assembly and removal of the gears and other structure within the housing 10. Opening 90 is covered by cover plate 92 which is held in place by bolts 94.

A cluster gear assembly is generally identified by reference character 96. It includes a first gear element 98 which serves as a power input gear element. Other gear elements of the assembly 96 are identified by reference characters 100, 102 and 104. Each of the gear elements of the assembly 96 forms a part of a common sleeve shaft 106. This shaft is formed with a central opening 108 through which a countershaft 110 is received. Shaft 110 is end supported by the housing walls 12 and 14. Wall 12 is formed with an opening 112 to receive one end of shaft 110 and the wall 14 is formed with an opening 114 to receive its other end. Spaced bearings 116 and 118 support rotatably the sleeve 106 upon shaft 110.

Gear element 104 is situated in meshing engagement with gear 36. Gear element 102 is situated in meshing engagement with gear 46. Gear element 100 is situated in meshing engagement with gear 56, and gear element 98 is situated in meshing engagement with the power input gear 76.

The gears 36, 46, 56 and 76 are adapted to be connected selectively to the power output shaft 22. This is accomplished by synchronizer clutch mechanisms identified generally by reference characters 120 and 122. Synchronizer clutch mechanism 120 includes the previously described hub 42 which is externally splined, as shown at 124, to an internally splined opening formed in a synchronizer clutch sleeve 126. Sleeve 126 can be moved axially upon the hub 42, but relative rotation therebetween is prevented.

Hub 42 is formed with angularly spaced recesses within which are situated synchronizer thrust bars 128. These are urged radially outwardly by radially expanding springs 130. The internally splined periphery of the opening formed in the sleeve 126 is formed with a detent groove 132 which is adapted to be engaged by cooperating projections formed on the outer surfaces of the thrust bars 128. Thus a spring loaded detent connection is established between sleeve 126 and thrust bars 128.

Sleeve 126 is formed with an annular groove 134 which receives the ends of shifter forks, as will be explained subsequently. The shifter forks are manually operable and are adapted to shift sleeve 126 in either axial direction.

Gear 36 is formed with a synchronizer cone clutch element 136. A blocker ring 138 is situated between the sleeve 126 and the gear 36 and is formed with an internal cone clutch surface which cooperates with an external cone clutch surface formed on the element 136. The outer periphery of blocker ring 138 is formed with synchronizer blocker teeth 140.

Gear 36 carries synchronizer clutch teeth 142 disposed directly adjacent the teeth 140. As the sleeve 126 is shifted in a right hand direction, as viewed in FIGURE 1, the thrust bars 128 will exert an axial force upon the blocker ring 138 thus engaging the cooperating cone clutch surfaces of the ring 138 and the element 136. A limited amount of rotary lost motion between sleeve 126 and the ring 138 can be accommodated. Thus, as the thrust bar 128 engages the ring 138, the ring 138 will be shifted angularly whenever the shaft 122 rotates at a speed that differs from the speed of gear 36. At this time the teeth 140 become misaligned with respect to the teeth of the internal splines of sleeve 126 and further shifting movement of the sleeve 126 then is prevented.

After the shaft 22 and the gear 36 rotate in synchronism, it is possible to shift the sleeve 126 past the blocker ring 138 since the teeth 140 then will become aligned with the teeth of the splines for sleeve 126. Upon continued shifting movement of the sleeve 126 in a right hand direction, its internal spline teeth will engage drivably the teeth 142, thereby establishing a direct connection between shaft 22 and gear 36. The detent connection between the thrust bars 128 and the sleeve 126, of course, yields upon continued movement of the sleeve 126.

This synchronizer clutch construction is rather conventional in the power transmission art and further detailed description of its structure and mode of operation is thought to be unnecessary to enable a skilled artisan to understand the improvements of my invention.

Gear 46 includes a cone clutch element 144. It cooperates with another blocker ring 146 which establishes synchronism between gear 46 and the sleeve 126 during shifting movement of the latter in a left-hand direction. Gear 46 also carries synchronizer clutch teeth 148 which are engaged by the teeth of the sleeve 126 as the mechanism is conditioned for second speed radio operation. Gear 46 then is connected directly to the shaft 22.

The synchronizer clutch assembly 122 is quite similar to the assembly 120. It includes a clutch sleeve 150 which is internally splined to establish a driving connection between the hub 64 and synchronizer clutch teeth 152 carried by gear 56. Sleeve 150 is adapted also to engage drivably synchronizer clutch teeth 154 carried by gear 76.

A blocker ring 156 having external blocker teeth is situated between sleeve 150 and teeth 152. It functions in the manner previously described to establish synchronism between gear 56 and sleeve 150 prior to shifting movement of the sleeve 150 in a right-hand direction. Once engagement of the teeth 152 and the sleeve 150 is established, a direct driving connection is made between gear 56 and shaft 22.

As the sleeve 150 is shifted in a left-hand direction, the teeth of sleeve 150 engage teeth 154 thereby establishing a direct connection between shaft 20 and shaft 22.

Another synchronizer blocker ring 158 is situated between sleeve 150 and teeth 154. It cooperates with a cone clutch element 160 formed on the gear 76 and functions to establish synchronism between gear 76 and the sleeve 150 prior to shifting movement of the sleeve 150 in a left-hand direction.

A peripheral annular groove 162 is formed in the sleeve 150 to accommodate the ends of a shifter fork which may be manually controlled to shift the sleeve 150 in either axial direction.

The reverse drive gearing can best be observed by referring to FIGURES 3, 6, 7 and 9. A split reverse pinion is identified generally by reference character 164. It includes a reverse pinion gear element 166 which is adapted to engage continuously the gear element 104 of the cluster gear assembly 96. It includes also a sleeve shaft extension 168 which is formed with a central opening 170 through which a supporting countershaft 180 extends. Sleeve 168 and gear 166 are journaled upon shaft 180 by means of spaced bearings 182 and 184. Shaft 180 in turn is end supported by the wall 14 and by a boss 186 which forms a part of the housing 10. Boss 186 is formed with an opening 188 through which one end of shaft 180 is received. Wall 14 is formed with an opening 190 through which the other end of the shaft is received.

Sleeve 168 is externally splined as shown at 192 to provide a sliding splined connection with an internally splined reverse pinion gear element 194. Gear element 194 is adapted to shift axially upon the splined sleeve 168 but is prevented from rotating relative to it. One axial position of the gear element 194 is shown by means of full lines in FIGURE 7, and its other axial position is illustrated by means of dotted lines.

Synchronizer clutch sleeve 126 is formed on its periphery with a reverse gear 196 which is adapted to drivably engage gear element 194 when the latter assumes the full line position shown in FIGURE 7 and the sleeve assumes the neutral position shown in FIGURES 1 and 7.

Gear element 194 can be shifted to either of its axial positions by means of a shifter fork, the ends of which are received within an annular groove 198.

Referring next to FIGURE 2, I have illustrated three shift rails for shifting the shifter forks for the synchronizer clutch sleeve and the shiftable reverse pinion gear element. The shift rail associated with the synchronizer clutch assembly 120 is identified by reference character 200. The shift rail associated with the reverse pinion 164 is identified by reference character 202, and the shift rail associated with the synchronizer clutch assembly 122 is shown at 204.

The side of the transmission housing 10 is formed with a boss 206. Three openings are formed in the boss 206 and they are identified separately by reference characters 208, 210 and 212. One end of shift rail 200 is received within the opening 208 and the other end thereof is received within an opening 214 formed in the transmission housing end wall 14. An intermediate portion of the rail 200 extends through a collar 216, as shown in FIGURES 2 and 4. This collar is held fast upon the rail 200 by means of a set screw 218.

The collar 216 forms a part of a shifter fork identified generally by reference character 220. Fork 220 includes arms 222 and 224, the ends of which are received within groove 134 formed in the sleeve 126. These ends are identified respectively by reference characters 226 and 228.

Collar 216 is formed with a vertically extending slot 230 which receives a pin 232. This pin is carried at the end of a shift lever 234 which in turn is journaled for rotation about an axis that is transversely disposed with respect to the axis of shaft 22. The journal is provided by a pivot shaft 236, as shown in FIGURE 10, which in turn is received within a cooperating opening formed in a boss 238 formed on the exterior of the housing 10. The end of shaft 236 can be threaded, as shown at 240, to establish a fixed connection with an externally mounted shift lever 242. As the lever 242 is rotated about the axis of shaft 236, lever 234 rotates within the housing 10 thereby shifting the collar 216 and the shift fork 220 axially. The pin 232 rises and falls within the groove 230 during this shifting movement. Thus the rotary motion of the lever 242 is translated into rectilinear motion of the shift rail 200.

Each of the three operating positions of the shift rail 200 are defined by detent recesses 244, 246 and 248, as shown in FIGURE 2. These recesses are adapted to be engaged by a detent plunger 250 situated within an opening 252 formed in the boss 206. It is urged into the detent recesses by a detent spring 254. The spring in turn is held in place by a retainer 256 which is threadably received within a threaded portion of the opening 252.

A shifter fork for the reverse pinion assembly is identified generally by reference character 258. It includes a fork 260 having an end 262 which is received within groove 198 in the pinion gear element 194. Fork 258 includes also a collar 264 having an opening through which shift rail 202 extends. Collar 264 is held axially fast upon rail 202 by a set screw 266. The collar 264 includes a vertical groove 268 which receives a pin 270 carried by a shift lever 272. Lever 272 in turn is connected to a pivot shaft 274 so that it rotates in unison with it. Shaft 274 is rotatably journaled within an opening 276 formed in a boss 278 situated externally of the housing 10.

The outer end of shaft 274 has keyed thereto a shift lever 280. Lever 280 is held fast upon shaft 274 by a locking nut 282. As the shift lever 280 is rotated about the axis of shaft 274, lever 272 oscillates within the transmission housing 10 and its rotary motion is translated into rectilinear motion of the rail 202 by reason of the pin and slot connection shown at 268 and 270.

Rail 202 thus can be shifted axially and its two axial positions are defined by detent recesses 284 and 286. These recesses are adapted to be engaged by a detent plunger 288 situated within an opening 290 formed in boss 206. Plunger 288 is spring loaded by detent spring 292 located on the opening 290. One end of rail 202 is received slidably within an opening 271 formed in wall 14.

Shift rail 204 is received through an opening formed in a collar 294 as best seen in FIGURES 2 and 3. The collar forms a part of a shifter fork identified generally by reference character 296. Fork 296 includes also arms 298 and 300 carried by the collar 294. The arms in turn include end portions 302 and 304, respectively, which are received within groove 162 in the synchronizer clutch sleeve 150.

Collar 294 is formed with a vertical groove 306 which receives a pin 308 carried by one end of shift lever 310. The other end of the lever 310 is secured to a pivot shaft 312 and rotates in unison with it. Shaft 312 is journaled within an opening 314 formed in a boss 316 located on the exterior of the housing 10. The outward end of shaft 312 is keyed to a shift lever 318 and held axially fast thereon by lock nut 320. Lever 318 can be oscillated about the axis of shaft 312 thereby causing corresponding rotary motion of lever 310. This motion is translated into rectilinear motion of the shift rail 204.

One end of shift rail 204 is received through opening 210 in the boss 206 and the other end is supported within an opening 322 formed in the forward housing wall 12.

A detent arrangement is provided for defining each of the three operating positions for the shift rail 204. This can be observed by referring to FIGURE 8 wherein the detent recesses are identified by reference characters 324, 326 and 328. These recesses are adapted to be engaged by a detent plunger 330 that is received within an opening 332 formed in the boss 206. The plunger 330 is spring loaded by detent spring 334. A spring back-up screw is shown at 336.

An interlock arrangement is provided for the shift rails 200, 202 and 204 to prevent simultaneous movement of two shift rails during operation of the transmission mechanism. It includes a plunger 338 which is received within an opening 340 formed in the boss 206. Includes also a plunger 342 received within an opening 344 formed in the boss 206. Situated between the plungers 338 and 342 is a pin 346 which is slidably received within a transverse opening 348 formed in the shift rail 204.

Interlock recesses are formed in shift rail 202 and shift rail 204 adjacent either axial end of the plunger 338. Similarly, shift rails 204 and 200 are formed with recesses situated adjacent either axial end of the plunger 342. Thus, if the shift rail 200 is shifted from the position shown in FIGURE 2 to either of its other two axial positions, plunger 342 will shift the pin 346 downwardly as viewed in FIGURE 2, thereby shifting the plunger 338 downwardly into engagement with the interlock recess formed in rail 202. At the same time, plunger 342 engages the cooperating interlock recess formed in rail 204. Thus, it is impossible to move either rail 202 or 204 after the rail 200 has been shifted.

If the rail 202 is shifted from the position shown in FIGURE 2, plunger 340 will be urged upwardly, thereby shifting pin 346 and plunger 342 upwardly. Plunger 338 will engage the cooperating interlock recess formed in rail 204 and the plunger 342 will engage the cooperating recess formed in rail 200. Thus, movement of rails 204 and 200 will be prevented whenever the rail 202 is shifted.

If the rail 204 is shifted from the position shown in FIGURE 2, the detent plungers 342 and 338 will be urged upwardly and downwardly respectively, thereby locking rails 200 and 202 to prevent shifting movement of either of them after the rail 204 has been shifted.

The interlock arrangement prevents simultaneous operation of two geared power flow paths.

The shift levers 280, 242 and 318 are under the control of the vehicle operator and may be actuated by means of a suitable gear shift linkage mechanism not shown.

To establish first speed ratio operation, it merely is necessary to shift the synchronizer clutch sleeve 126 in a right-hand direction, thereby locking gear 36 to the power output shaft 22. Engine torque then is delivered through the neutral clutch and through gear 76 to the cluster gear assembly. Gear element 104 then drives gear 36 and the power output shaft 22 at a reduced speed ratio.

To establish second speed ratio operation, synchronizer clutch sleeve 126 is shifted in a left-hand direction thereby disengaging gear 36 from the shaft 22 and locking gear 46 to it. The power flow path from the engine then includes shaft 20, gear 76, gear element 98, gear element 102, gear 46, synchronizer clutch assembly 120 and the power output shaft 22.

To establish third speed ratio operation, the synchronizer clutch sleeve 126 is shifted to the neutral position shown in FIGURE 1. Thus, both gears 46 and 36 are disengaged from the shaft 22. Synchronizer clutch sleeve 150 is shifted in a right-hand direction to establish a synchronous connection between gear 56 and shaft 22. The power flow path from the engine then includes shaft 20, gear 76, gear element 98, gear element 100, gear 56, synchronizer clutch assembly 122 and power output shaft 22.

To establish direct drive high speed ratio operation, the synchronzer clutch sleeve 152 is shifted in a left-hand direction, as viewed in FIGURE 1, thereby releasing gear 56 and locking with a synchronous action the gear 76 to the power output shaft 22. Thus, a direct drive connection is established between shafts 20 and 22 through the synchronizing clutch assembly 122.

To establish reverse drive operation, the synchronizer clutch 150 and 126 are shifted to their neutral positions shown in FIGURE 1. Reverse pinion gear element 194 is shifted in a left-hand direction to the position shown in FIGURE 7 by means of full lines. When the sleeve 126 assumes a neutral position and the gear element 194 is shifted as shown in FIGURE 7, they mesh with each other thereby providing a geared connection between gear element 104 and reverse gear 196. Engine torque then is delivered through shaft 20, through gear 76, through gear element 98, through gear element 104, and through gear elements 166 and 194 to the reverse gear 196, the latter in turn being connected dircetly to the power output shaft 22.

Referring to FIGURE 6, it will be apparent that gear element 194 is disengaged entirely from gear 196 as the latter assumes any one of its three operating positions. If gear 196 is shifted in a right-hand direction to establish low speed ratio operation, there will be a clearance between the teeth of gear element 194 and the teeth of gear 196.

In FIGURE 11 I have illustrated a modified form of a reverse pinion gear assembly. In FIGURE 11 the elements that have counterpart elements in the embodiments of FIGURES 1 through 10 have been indicated by similar reference characters although primed notations have been added.

The modified assembly includes a gear element 166' which drivably engages continuously gear element 104' of the main cluster assembly 106'. It includes also a counter shaft 180' which is end supported by the transmission end housing wall 14' and the boss 186'. The wall 14' includes an opening 190' which receives one end of shaft 180' and the boss 186' includes an opening 188' which receives its other end.

Gear 166' includes an extension 360 which is rotatably supported on shaft 180' by means of bushings 184' and 182'. The other cylindrical surface of extension 360 is formed with clutch teeth 362. A pinion gear element 364 is rotatably supported upon the extension 360 by means of a bushing 366. This bushing 366, by preference, is secured within a central opening formed in the hub of gear element 364. An annular groove 368 is formed in the gear element 364 to accommodate a reverse shifter fork of the type shown in FIGURE 4.

The opening in the hub of gear element 364 is formed with internal clutch teeth 370 which are adapted to engage the external teeth 362 as gear element 364 is shifted in the right hand direction upon sleeve 360.

The external teeth of gear element 364 are shown at 372 and they mesh continuously with the teeth of gear 196' as gear element 364 is shifted from one axial position to the other.

If the gear element 364 assumes the dotted line position shown in FIGURE 11, the reverse drive power flow path is interrupted. On the other hand, if the gear element 364 is shifted to the full line position shown in FIGURE 11, the reverse drive power flow path is established. The synchronizer clutch sleeves, of course, both assume the neutral position.

By employing a modified reverse drive gear arrangement of this type, it is possible to eliminate the total travel necessary to shift the reverse pinion and establish or interrupt the reverse drive power flow path. This simplifiers the gear shifting linkage and makes it possible to reduce the shift effort by increasing the mechanical advantage of the gear shifting linkage.

Having thus described the principal features of my invention, what I claim and desire to secure by U.S. Letters Patent is:

1. In a power transmission mechanism for delivering driving torque from a driving shaft to a power output shaft, a power input gear connected to said driving shaft, a plurality of power output gears rotatably supported on said power output shaft, a cluster gear assembly mounted for rotation about an axis that is parallel to the axis of said power output shaft, said cluster gear assembly including a plurality of gear elements one of which engages said power input gear while each of the others engages a separate one of said power output gears, a first synchronizer clutch means for connecting selectively a first and a second power output gear to said output shaft, a second synchronizer clutch means for connecting selectively another power output gear and said power input gear to said power output shaft, a reverse pinion gear assembly comprising a pair of gear elements rotatably supported by rotation about and axis that is spaced from and parallel to the axes of said power output shaft and said cluster gear assembly, a first gear element of said reverse pinion gear assembly being engageable continuously with one gear element of said cluster gear assembly, the gear elements of said reverse pinion gear assembly being connected together for rotation in unison, the connection between said reverse pinion gear elements accommodating axial sliding movement of the second reverse pinion gear element with respect to the first reverse pinion gear element, and a reverse gear connected to said power output shaft, said reverse gear said second reverse pinion gear element being engageable when the latter assumes one axial position to establish a reverse power flow path when said first synchronizer clutch means assumes a neutral condition.

2. In a power transmission mechanism for delivering torque from a driving shaft to a power output shaft, said shafts being axially aligned, a power input gear connected to said driving shaft, first, second and third power output gears rotatably mounted upon said power output shaft, a cluster gear assembly comprising first, second, third and fourth gear elements that respectively mesh with said power input gear and said first, second and third power output gears, a first synchronizer clutch means for selectively connecting said first and second power output gears to said power output shaft to establish respectively a first and second driving speed ratio, second synchronizer clutch means for connecting selectively said third power output gear and said power input gear to said power output shaft to establish respectively a third and a high speed ratio, and a reverse pinion gear assembly comprising a first portion engageable with said cluster gear assembly, said first synchronizer clutch means including an axially movable sleeve having formed thereon an external reverse gear, said reverse pinion gear assembly comprising a second portion engageable with said reverse gear during reverse drive operation.

3. In a power transmission mechanism for delivering torque from a driving shaft to a power output shaft, said shafts being axially aligned, a power input gear connected to said driving shaft, first, second and third power output gears rotatably mounted upon said power output shaft, a cluster gear assembly comprising first, second, third and fourth gear elements that respectively mesh with said power input gear and said first, second and third power output gears respectively, a first synchronizer clutch means for selectively connecting said first and second power output gears to said power output shaft to establish respectively a first and second driving speed ratio, a second synchronizer clutch means for connecting selectively said third power output gear and said power input gear to said power output shaft to establish respectively a third and a high speed ratio, and a reverse pinion gear assembly comprising a first portion engageable with said cluster gear assembly, said synchronizing clutch sleeve having formed thereon an external reverse gear, said reverse pinion gear assembly comprising a second portion engageable with said reverse gear during reverse drive operation, said first synchronizer clutch assembly including an axially shiftable sleeve that carries said reverse gear, said sleeve being adapted to assume either one of two axial positions to establish selectively a driving connection between said first power output gear and said power output shaft and said second power output gear and said power output shaft, said second reverse pinion gear element being connected to said first reverse pinion gear element for rotation in unison and being axially shiftable relative thereto to establish and interrupt a reverse power flow path, said second reverse pinion gear element being shiftable out of engagement with respect to said reverse gear when said power transmission mechanism is conditioned for forward drive operation.

4. In a power transmission mechanism for delivering torque from a driving shaft to a power output shaft, said shafts being axially aligned, a power input gear connected to said driving shaft, first, second and third power output gears rotatably mounted upon said power output shaft, a cluster gear assembly comprising first, second, third and fourth gear elements that respectively mesh with said power input gear and said first, second and third power output gears respectively, a first synchronizer clutch means including an axially shiftable sleeve for selectively connecting said first and second power output gears to said power output shaft to establish respectively a first and second driving speed ratio, second synchronizer clutch means for connecting selectively said third power output gear and said power input gear selectively to said power output shaft to establish respectively a third and a high speed ratio, and a reverse pinion gear assembly comprising a first portion engageable continuously with said cluster gear assembly, said synchronizing clutch sleeve having formed thereon an external reverse gear, said reverse pinion gear assembly comprising a second portion engageable with said reverse gear during reverse drive operation, said second portion being rotatably journaled upon said first portion and being axially shiftable relative thereto, said first and second portion including engageable clutch teeth that are adapted to engage each other as said second portion assumes one axial position, said second portion being in continuous meshing engagement with said reverse gear.

5. In a power transmission mechanism for delivering driving torque from a driving shaft to a power output shaft, a power input gear connected to said driving shaft, a plurality of power output gears rotatably supported on said power output shaft, a cluster gear assembly mounted for rotation about an axis that is parallel to the axis of said power output shaft, said cluster gear assembly including a plurality of gear elements one of which engages said power input gear while each of the others engages a separate one of said power output gears, a first synchronizer clutch means for connecting selectively a first and a second power output gear to said power output shaft, a second synchronizer clutch means for connecting selectively another power output gear and said power input gear to said power output shaft, a reverse pinion gear assembly comprising a pair of gear elements rotatably supported for rotation about an axis that is spaced from and parallel to the axes of said power output shaft and said cluster gear assembly, a first gear element of said reverse pinion gear assembly being engageable continuously with one gear element of said cluster gear assembly, the gear elements of said reverse pinion gear assembly being connected together for rotation in unison, the connection between said reverse pinion gear elements accommodating axial sliding movement of the second reverse pinion gear element with respect to the first reverse pinion gear element, a reverse gear connected to said power output shaft, said reverse gear and said second reverse pinion gear element being engageable when the latter assumes one axial position to establish a reverse power flow path when said first synchronizer clutch means assumes a neutral condition, a pair of shift rails, a collar carried by each shift rail, each collar carrying a shift fork, the ends of one fork being engageable with axially movable portions of said first synchronizer clutch means and the ends of the other fork being engageable with axially movable portions of said second synchronizer clutch means, and a pair of shift levers mounted rotatably upon a stationary portion of said mechanism, one end of each shift lever carrying a shift fork actuator element, each collar being formed with a groove that receives one of said actuator elements whereby rotary motion of said shift levers will result in a rectilinear motion of said shift rails and the associated shift forks.

6. In a power transmission mechanism for delivering torque from a driving shaft to a power output shaft, said shafts being axially aligned, a power input gear connected to said driving shaft, first, second and third power output gears rotatably mounted upon said power output shaft, a cluster gear assembly comprising first, second, third and fourth gear elements that respectively mesh with said power input gear and said first, second and third power output gears, a first synchronizer clutch means for selectively connecting said first and second power output gears to said power output shaft to establish respectively a first and second driving speed ratio, second synchronizer clutch means for connecting selectively said third power output gear and said power input gear to said power output shaft to establish respectively a third and a high speed ratio, a reverse pinion gear assembly comprising a first portion engageable with one element of said cluster gear assembly, said first synchronizer clutch means including an axially movable sleeve having formed thereon an external reverse gear, said reverse pinion gear assembly comprising a second portion engageable with reverse gear during reverse drive operation, a pair of shift rails, a collar carried by each shift rail, each collar carrying a shift fork, the ends of one fork being engageable with axially movable portions of said first synchronizer clutch means and the ends of the other fork being engageable with axially movable portions of said second synchronizer clutch means, and a pair of shift levers mounted rotatably upon a stationary portion of said mechanism, one end of each shift lever carrying a shift fork actuator element, each collar being formed with a groove that receives one of said actuator elements whereby rotary motion of said shift levers will result in a rectilinear motion of said shift rails and the associated shift forks.

References Cited by the Examiner
UNITED STATES PATENTS

| 2,311,201 | 2/43 | Backus | 74—333 |
| 2,669,880 | 2/54 | Brock et al. | 74—360 |
| 3,106,851 | 10/63 | Ivanchich | 74—475 |

DON A. WAITE, *Primary Examiner.*